(No Model.)
M. L. KILLAM.
HUB FOR VEHICLES.
No. 537,779. Patented Apr. 16, 1895.
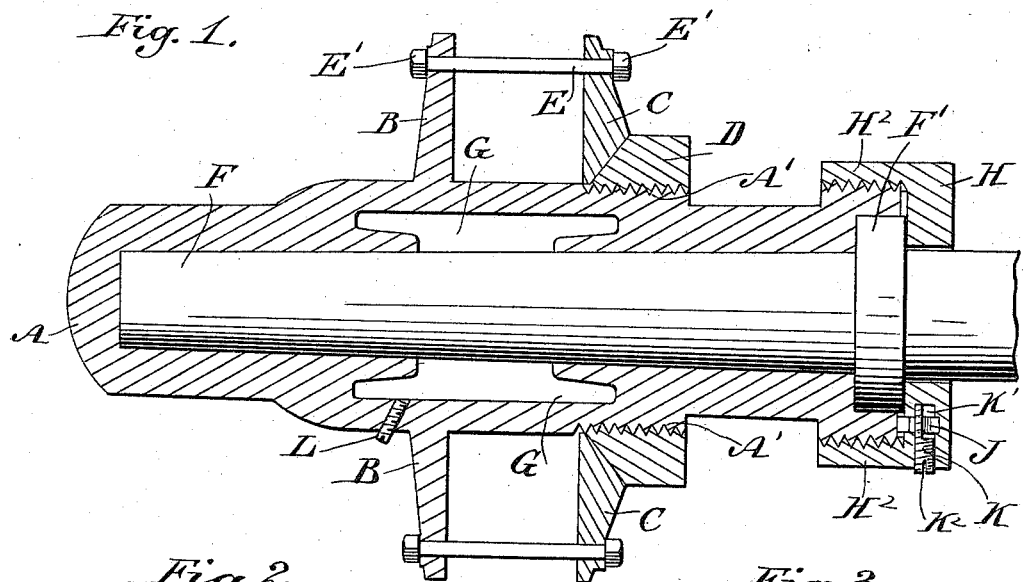
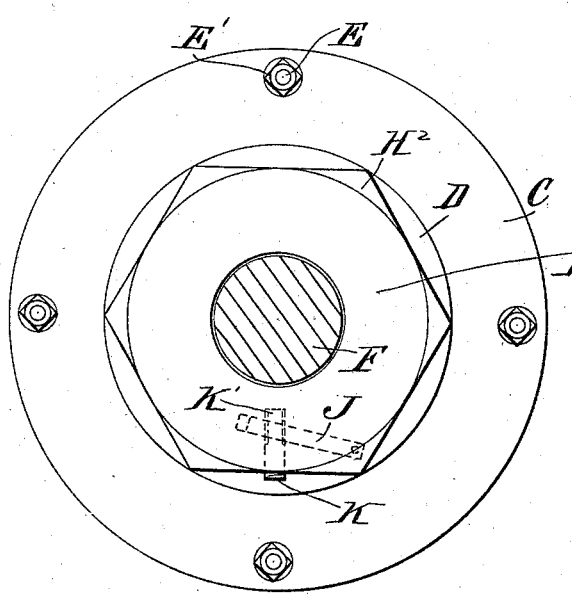
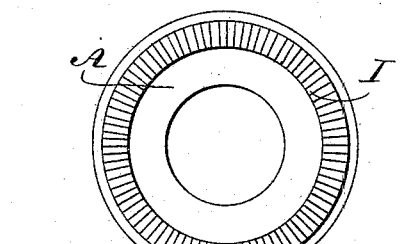
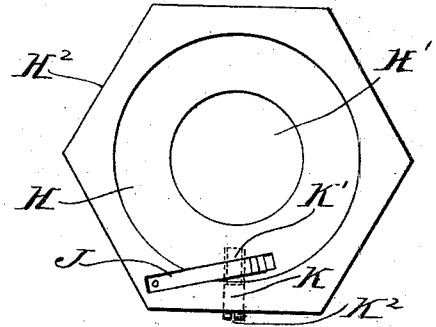
Witnesses
Inventor
Martin L. Killam
By his Attorneys
Edgar Tate & Co.

UNITED STATES PATENT OFFICE.

MARTIN LUTHER KILLAM, OF MALONE, NEW YORK.

HUB FOR VEHICLES.

SPECIFICATION forming part of Letters Patent No. 537,779, dated April 16, 1895.

Application filed June 16, 1894. Serial No. 514,768. (No model.)

*To all whom it may concern:*

Be it known that I, MARTIN LUTHER KILLAM, a citizen of the United States, and a resident of Malone, county of Franklin, and State of New York, have invented certain new and useful Improvements in Hubs for Vehicles, of which the following is a specification, reference being had to the accompanying drawings, forming a part thereof, in which similar letters of reference indicate corresponding parts in all the figures.

This invention relates to hubs for wagons, carriages and other vehicles, and has for its object to provide a simple, cheap, readily constructed and perfectly operating device of this character, by means of which a non-leakable reservoir for oil is provided, a rigid and tight fastening of the spokes to the said hub is insured, and the attachment of the said hub to the axle so arranged that any slipping therefrom or loosening of the parts are prevented.

The invention consists in the novel construction and arrangement of parts necessary to effect the above-mentioned results and hereinafter fully described.

In the accompanying drawings, forming a part of this specification, in which like letters of reference designate corresponding parts throughout, Figure 1 is a longitudinal section taken through the center of a hub embodying my invention, the axle inserted within the same being shown in elevation. Fig. 2 is a rear elevation of the same. Fig. 3 is a rear elevation of the edge of the hub. Fig. 4 is an elevation of the nut which secures the hub to the axle, the same being an interior view thereof.

In the practice of my invention, I construct a hub A of metal, substantially cylindrical in shape, and solid or permanently closed at the outer end. The said hub A has the usual rigid flange B upon the exterior thereof, and a movable flange C adjacent to the flange B. In my improved device the hub is screw-threaded rearward of this movable flange C at A', and a nut D is inserted thereon, the said nut being interiorly screw-threaded to engage with the surface A' of the hub. The flange C is concaved upon its inner periphery to form a conical depression therein flaring in the direction of the vehicle body, and the nut D is also formed conical upon that side thereof which abuts against the flange C. By this means, when the spokes of the wheels are placed between the flanges B and C, the nut D may be turned to force the said flange C upon the said spokes, and maintain them rigidly in place. For greater security, however, I pass through both of the said flanges near their outer ends bolts E, having nuts E' at either or both ends thereof.

The hub may be cast in one piece or in two sections joined together, and at the interior thereof is longitudinally apertured to permit the entrance of the axle F; and the said hub is also cut away at the rear end to enable the usual collar F' upon the axle to fit therein. Within the hub and extending therein to an appreciable depth is an annular recess G adapted to receive oil, which is so formed as to be longest at the bottom thereof, with a shorter mouth, whereby the oil comes in contact with the axle only upon a certain area but at the same time there being ample space provided to receive a quantity of oil sufficient to last for some considerable time. This recess is preferably located immediately in alignment with the spokes.

At the rear end of the hub, the same is screw-threaded to receive the securing nut H, and the edge or face of the said hub has formed thereon throughout its entire circumference teeth I whereby the said edge of the hub is circumferentially serrated or ratcheted. The nut H has therein a central aperture H' for the passage of the axle F, and upon its outer edge has formed thereon an annular interiorly screw-threaded flange $H^2$, which engages with the screw-threaded end of the hub to secure the axle thereto, its withdrawal being prevented by the collar F'.

Upon the inside of the nut H is mounted a steel or other metallic spring J, which is secured at one end in the flange $H^2$, the latter being cut out for that purpose. The said spring is approximately straight in shape, or slightly curved, and if desired the face of the nut may be sufficiently cut out to enable the spring to be sunk therein. The said spring ranges slightly toward the center of the nut in such manner as to bear at the point upon the ratcheted surface I of the hub when forced toward the same.

In the body of the nut H is inserted a cylindrical screw K, the rear side of which is cut away at K'. The spring is normally held toward the hub as the surface of this screw bears against it, but upon the said screw being turned, the spring will be released from engagement with the edge of the said hub. The screw K projects slightly beyond the outside of the nut and has formed therein a slit or aperture $K^2$ by means of which it may be turned.

The operation of my improved hub will be readily understood from the foregoing description taken in connection with the accompanying drawings. The spokes are first secured to the hub by placing the same between the flanges B and C, the flange C being thereupon forced toward the flange B by rotating the nut D, which fits therein by reason of the conical shape of both the said flange and the nut, and by this means, the spokes are clamped to the hub. If desired the bolts E are passed through the said flanges and the nuts E' secured thereon, and the said bolts may also if desired pass through one or more of the said spokes, though this and in fact even the use of the said bolts, will probably not be essential. The recess G is then filled wholly or partially with oil, grease or other lubricating material, and the axle F inserted in the hub as shown in Fig. 1, the collar F' thereupon resting in the end thereof. The nut H is then slipped upon the axle from the rear if not theretofore otherwise mounted upon the said axle, and brought forwardly till it engages with the screw-threaded periphery of the hub at the rear, whereupon the said nut is screwed upon the said hub till tightly fastened thereon. The screw K being in the position shown in Fig. 1, the spring J engages with the ratcheted surface I upon the edge of the hub, thereby preventing any rearward movement and consequent loosening of the said nut H.

When it is desired to obtain access to the interior of the hub, to remove the same from the axle, or to refill the oil reservoir, the screw K is turned to the extent of a half revolution, whereupon the spring J will be released from engagement with the ratcheted surface I and of its own tension spring rearwardly or into the body of the said nut. The nut H may then be unscrewed and the various parts, or any of them, removed. This construction will not of course interfere with the usual method of using extra washers in tightening the parts from time to time as they are worn away.

Having thus fully described my invention, what I claim as new, and desire to secure by Letters Patent, is—

1. A hub for wagons and other vehicles, comprising a tubular body closed at the forward end and open at the rear, and having flanges upon the exterior thereof to secure the spokes, teeth or serrations formed upon the rear edge of the hub, a nut mounted upon the axle and screwed upon the hub, a spring secured at one extremity to the under side of the nut and free at the other whereby it engages with the teeth upon the hub, and a screw mounted in the nut and reduced at the end to form an eccentric portion engaging the spring to release the same, substantially as shown and described.

2. A nut adapted to be screwed upon a hub or other body, a plate spring secured at one extremity to the under side of the nut and free at the other whereby it may engage with a serrated surface, and a screw mounted in the nut and reduced at the end to form an eccentric portion resting beneath the spring, whereby the turning of the screw releases the spring, substantially as shown and described.

In testimony that I claim the foregoing as my invention I have signed my name, in presence of two witnesses, this 11th day of June, 1894.

MARTIN LUTHER KILLAM.

Witnesses:
HIRAM BROOKS,
JOHN HORSMAN.